AVERY & LECKENBY.
Draft Equalizer.
No. 86,491.  Patented Feb 2, 1869.
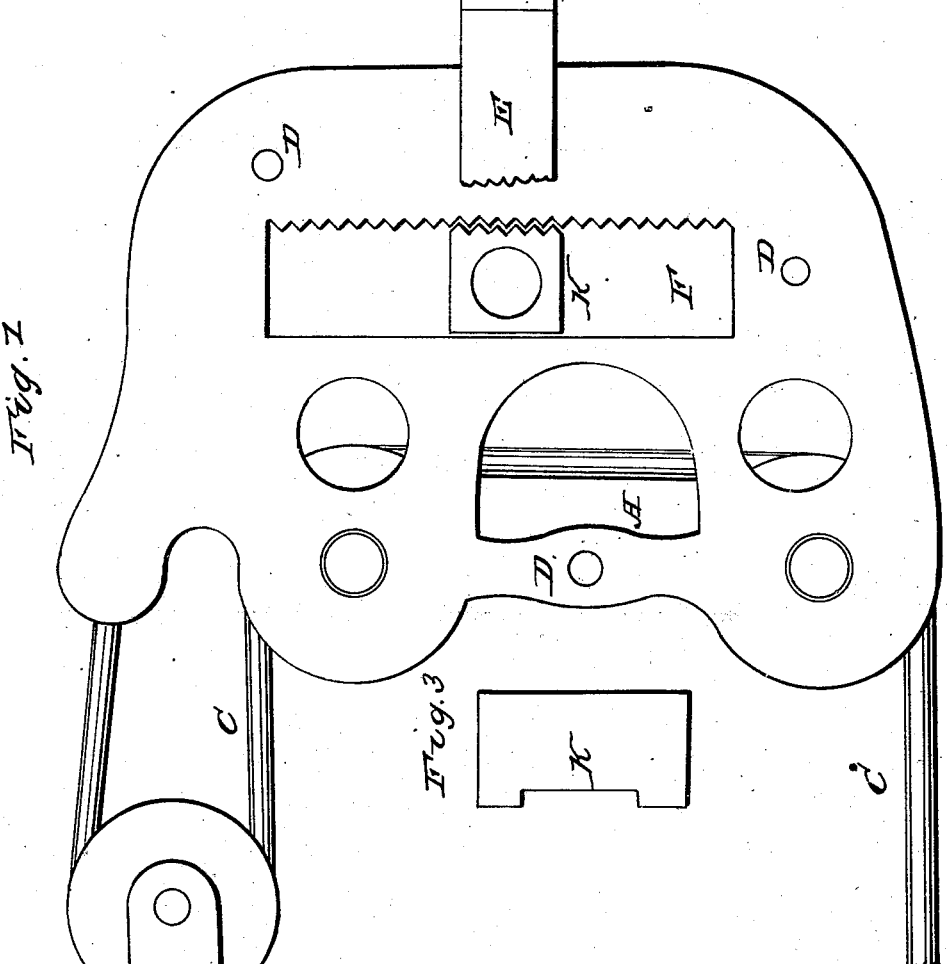

EDWIN F. AVERY AND HARMON B. LECKENBY, OF DOWAGIAC, MICHIGAN.

Letters Patent No. 86,491, dated February 2, 1869.

IMPROVED THREE-HORSE EQUALIZER.

The Schedule referred to in these Letters Patent and making part of the same.

To all whom it may concern:

Be it known that we, EDWIN F. AVERY and HARMON B. LECKENBY, of Dowagiac, in the county of Cass, and State of Michigan, have invented a new and useful Method for Equalizing the Draught of Three Horses; and we do hereby declare that the following is a full and exact description of the construction and operation of the same, reference being had to the annexed drawing, making a part of this specification, in which—

Figure 1 is a side view, and

Figure 2 is a detached front view of the larger sheave-block; and

Figure 3 shows the adjustable draught-block.

The nature of our invention consists in using two sheave-blocks, A and B, arranged as follows:

A is attached to the plow, and is of peculiar construction, as hereinafter described. B is a single-sheave block, of the ordinary construction, and attached, by means of the common clevis, to a long two-horse evener; and the two sheave-blocks, A and B, are connected together by means of the chain C, one end of which is attached permanently to the sheave-block A; the other is passed around the pulley in sheave B, and back over the upper pulley, then down under the lower pulley in sheave-block A, thence forward to and under sheave B, where the third horse is attached between the other two horses, for the purpose of working three horses abreast, with equal draught.

To enable others skilled in the art to make and use our invention, we will proceed to describe its construction and operation.

The sheave-block A is made of cast-iron, in two parts, and are fastened together by means of three wrought-iron rivets, cast in and projecting from the ends of studs D D D. Said studs project from the inner side of one part of the sheave-block A, and are of sufficient length to hold the two parts of sheave-block A the right distance apart to receive the pulleys P P.

L L are lugs, provided with hollow studs, projecting from the inner side of each part of sheave-block A, to receive the lug-pin X, to which the draught-chain C is attached.

Now, it will be seen that one-half of the draught of the two horses hitched to sheave-block B, will be expended on the lug-pin X; consequently the third horse, drawing at the other end of chain C, through the medium of one or more pulleys in the sheave-block A, will have but one horse to draw against. Thus the draught will be equally divided between the three horses.

The two sheave-blocks, A and B, should be put at such a distance apart as to allow of a sufficient range for the varying speed of the several horses.

F is a toothed slot, for the purpose of holding an adjustable-toothed draught-block, K, in which the pin of clevis E (partly shown in fig. 1, broken off, to show block K,) works, and may be easily moved by taking the clevis E off, and drawing the block K endways, far enough to clear the teeth, thus varying the draught as may be desired; and we propose to use a similar or equivalent toothed block, K, and toothed slot F, in two-horse eveners.

Having thus described our invention,

What we claim as new, and desire to secure by Letters Patent, is—

1. The arrangement of sheave-block B, in combination with the chain C, pulleys P P, and sheave-block A, as specified.

2. The construction and arrangement of sheave-block A.

3. The toothed slot F, and the adjustable tooth-block K, as and for the purpose specified.

In evidence that we claim the foregoing, we have hereunto set our hands, this 5th day of September, 1868.

EDWIN F. AVERY.
    HARMON B. LECKENBY.

Witnesses:
 S. BOWLING,
 S. H. WHEELER.